United States Patent
Kumar

(10) Patent No.: US 10,444,819 B2
(45) Date of Patent: Oct. 15, 2019

(54) TECHNIQUES TO CONTROL COMPUTATIONAL RESOURCES FOR AN ELECTRONIC DEVICE

(71) Applicant: Intel Corporation, Santa Clara, CA (US)

(72) Inventor: Mahesh P. Kumar, Bangalore (IN)

(73) Assignee: INTEL CORPORATION, Santa Clara, CA (US)

( * ) Notice: Subject to any disclaimer, the term of this patent is extended or adjusted under 35 U.S.C. 154(b) by 451 days.

(21) Appl. No.: 14/745,238

(22) Filed: Jun. 19, 2015

(65) Prior Publication Data

US 2016/0370844 A1 Dec. 22, 2016

(51) Int. Cl.
*G06F 1/324* (2019.01)
*G06F 3/0488* (2013.01)
*G06F 3/041* (2006.01)
*G06F 1/3206* (2019.01)

(52) U.S. Cl.
CPC ............ *G06F 1/324* (2013.01); *G06F 1/3206* (2013.01); *G06F 3/0416* (2013.01); *G06F 3/04883* (2013.01); *G06F 2203/04808* (2013.01); *Y02D 10/126* (2018.01)

(58) Field of Classification Search
CPC ...... G06F 3/044; G06F 3/0412; G06F 3/0416; G06F 1/3262; G06F 1/3206; G06F 1/3218; G06F 1/3231; G06F 1/324; G06F 1/3265; G06F 1/3293; G06F 3/04883; G06F 2203/04808; Y02D 10/126
USPC .......................................... 713/322; 715/863
See application file for complete search history.

(56) References Cited

U.S. PATENT DOCUMENTS

| 8,621,253 | B1 | 12/2013 | Brown et al. |
| 9,170,676 | B2 * | 10/2015 | Krulce ................. G06F 3/0416 |
| 2010/0313050 | A1 | 12/2010 | Harrat et al. |
| 2012/0120024 | A1 * | 5/2012 | Lin ......................... G06F 1/324 |
| | | | 345/175 |

(Continued)

FOREIGN PATENT DOCUMENTS

EP        2624098 A2     8/2013

OTHER PUBLICATIONS

International Search Report and Written Opinion received for PCT Patent Application No. PCT/US2016/033351, dated Aug. 30, 2016, 13 pages.

(Continued)

*Primary Examiner* — Ji H Bae
*Assistant Examiner* — Alyaa T Mazyad

(57) ABSTRACT

Approaches provided herein are directed to intelligently boosting, in a power efficient manner, CPU frequency in response to a touch gesture event. In some approaches, for example, a governor of a processor receives an instruction hint (e.g., an interaction hint or a vertical synchronization (VSYNC) hint) from a power hardware abstraction layer (HAL), the instruction hint provided in response to at least one of: a scrolling touch gesture to a user interface, and an application launch touch gesture. In another embodiment, an instruction hint is received at the governor in response to a discrete touch gesture to the user interface. In each case, a clock frequency corresponding to the processor is modified to optimize performance and user experience, while maximizing energy conservation.

25 Claims, 9 Drawing Sheets

(56) References Cited

U.S. PATENT DOCUMENTS

| | | | |
|---|---|---|---|
| 2013/0194194 A1* | 8/2013 | Van Eerd | G06F 3/041 |
| | | | 345/173 |
| 2013/0257781 A1 | 10/2013 | Phulwani et al. | |
| 2014/0285530 A1* | 9/2014 | Ohtsuka | G06F 3/0485 |
| | | | 345/684 |
| 2015/0026398 A1 | 1/2015 | Kim | |
| 2015/0054766 A1* | 2/2015 | Ishida | G06F 1/3262 |
| | | | 345/173 |
| 2015/0058646 A1 | 2/2015 | Kim | |
| 2015/0074436 A1 | 3/2015 | Jain et al. | |
| 2015/0205636 A1* | 7/2015 | Kulkarni | G06F 9/4881 |
| | | | 718/103 |
| 2016/0170944 A1* | 6/2016 | Bell | G06F 3/04842 |
| | | | 715/760 |

OTHER PUBLICATIONS

European Search Report for the European Patent Application No. EP16812117, dated Jan. 24, 2019, 2 pages.

* cited by examiner

*Apparatus 200*

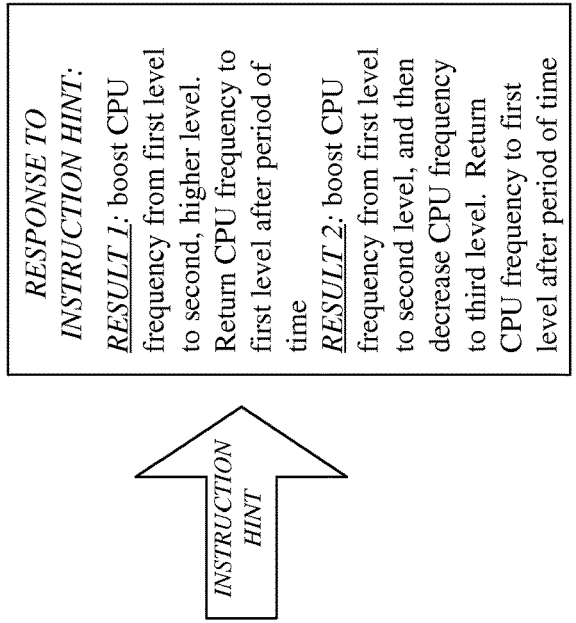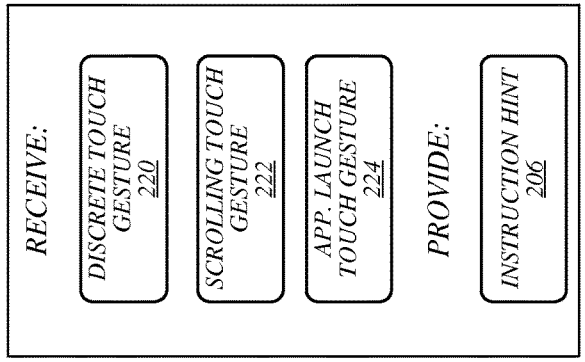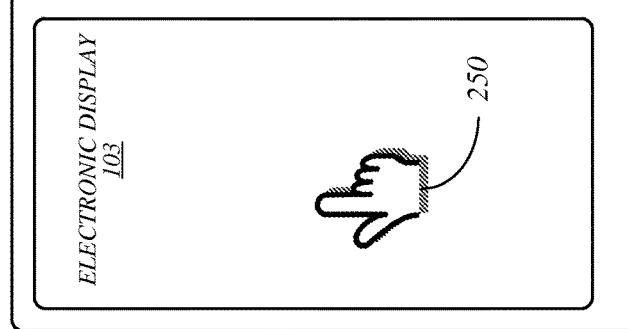
FIG. 2B

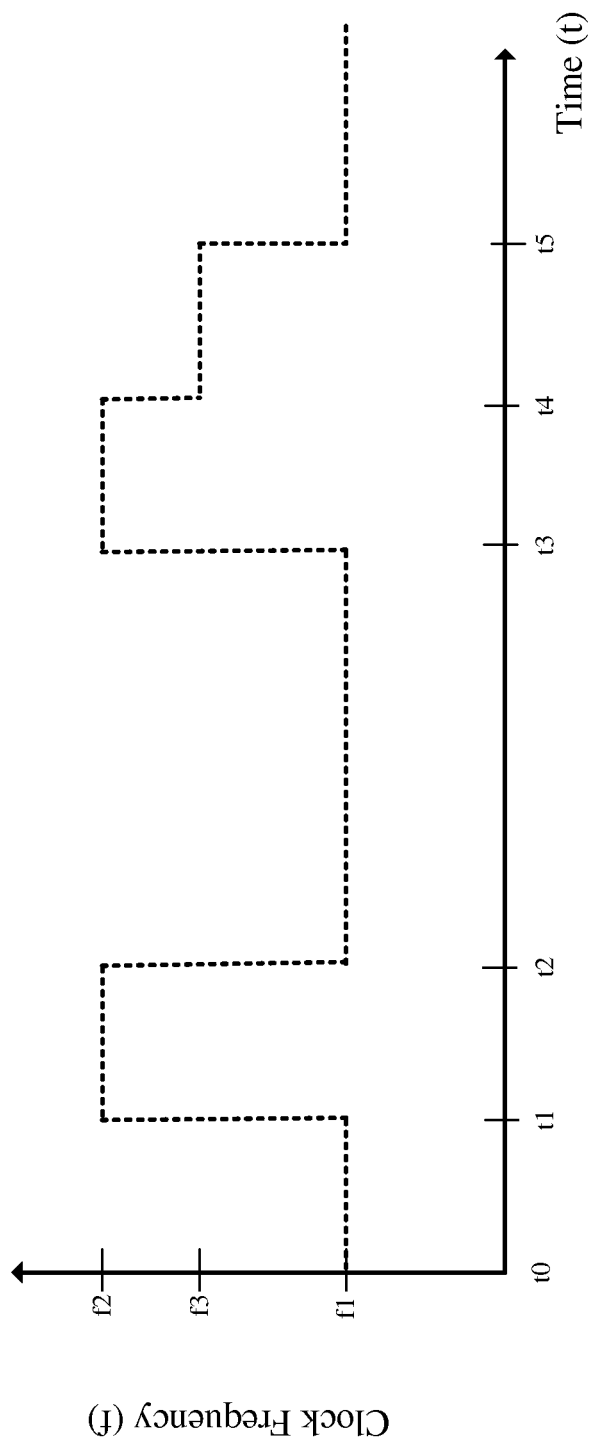

TECHNIQUES TO CONTROL COMPUTATIONAL RESOURCES FOR AN ELECTRONIC DEVICE

TECHNICAL FIELD

Embodiments described herein relate to clock frequency scaling. More specifically, embodiments described herein relate to approaches for intelligently controlling a clock frequency for a processor in a mobile device.

BACKGROUND

On devices with a limited power budget, such as mobile devices, it is increasingly important to manage power consumption to preserve battery life. Mobile devices, therefore, often have various mechanisms to adjust the processing capabilities based on various factors, such as the amount of power stored in the battery or user demand. Improvements to power management may lead to increased battery life and enhanced user experience.

BRIEF DESCRIPTION OF THE DRAWINGS

FIG. 2B illustrates one embodiment of an operation scenario for the apparatus.
FIG. 3 illustrates one embodiment of a frequency diagram.

DETAILED DESCRIPTION

Figure 1:
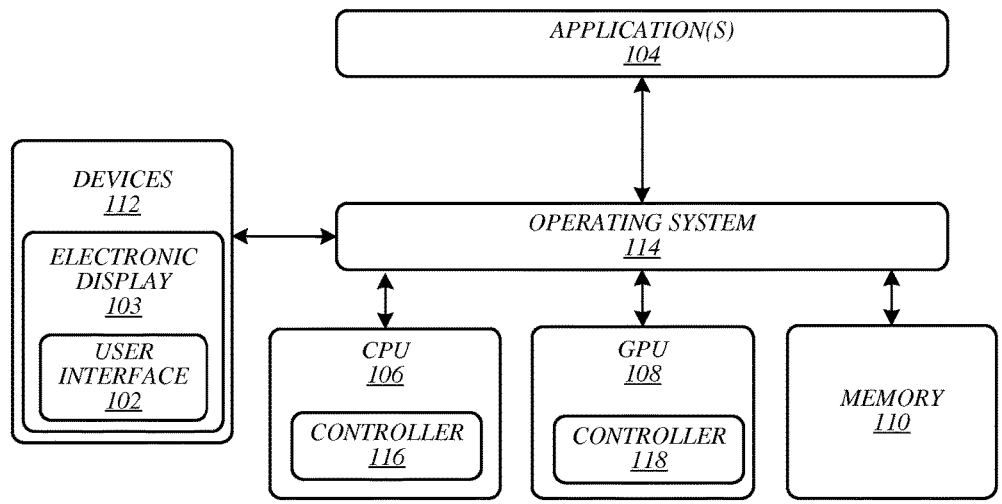
FIG. 1 illustrates one embodiment of a device.

It is increasingly desirable to manage power consumption of mobile devices to preserve battery life. Current approaches adjust one or more device components to reduce power consumption during varying periods of time based on system load. In one approach, a clock frequency of a central processing unit (CPU), a graphics processing unit (GPU), and/or a memory bus can be lowered to reduce power consumption during reduced system loads. When an increase in the system load is observed, the clock frequency to the CPU, GPU and/or the memory bus can be increased accordingly to make more computational resources available to the system. When subsequent measurements indicate that the system load has decreased, the clock frequency can be decreased.

This approach, however, can result in suboptimal performance and user experience, as a significant lag often results between the time the system load measurement is made and the time the clock frequency is scaled to provide the necessary computational resources. Although power savings are achieved, user experience suffers. Furthermore, if not performed intelligently, the increased clock frequency unnecessarily consumes battery life. It is with respect to this and other challenges that the examples described herein are needed.

Accordingly, various embodiments provided herein are directed to controlling, in a power efficient manner, an operational state for various components of an electronic device in response to a touch gesture event. More particularly, the various embodiments provided herein intelligently boost, in a power efficient manner, processor frequency (e.g., a CPU, GPU, baseband processor, controller, etc.) in response to a touch gesture event at a user interface of an electronic display. An advantage of these embodiments is that user experience is optimized, while power and performance targets are achieved. The various embodiments provided herein have been found to improve, for example, response time to start a browser application, frame rate of the device home screen (e.g., flickering) while operating background activities, reaction time to activate virtual/touch keyboard, response time to cold-launch opening of a messaging application, frame rate while transitioning from an application grid to the device home screen, frame rate while opening/closing a status bar, among other technical advantages.

In some embodiments, this is achieved by a governor of a processor that receives an instruction hint (e.g., an interaction hint or a vertical synchronization (VSYNC) hint) from a power hardware abstraction layer (HAL), the instruction hint provided by the power HAL in response to a control directive from a user interface. Examples of the control directive may include, without limitation, a touch gesture for a user interface presented on a touch-screen enabled display, such as a scrolling touch gesture to a user interface, an application launch touch gesture to the user interface that triggers an application launch, a discrete touch gesture, or other defined touch gesture received by the user interface. A touch gesture may be used as a basis for modifying a device resource, such as a clock frequency corresponding to the processor.

In some embodiments, the touch gesture initiates transmission of an instruction hint used to modify an operational state for hardware or software components of an electronic device. An instruction hint may comprise any indicator generated in response to a touch gesture that represents a modification request to modify an operational state for a hardware and/or software component of an electronic device. In one embodiment, for example, an instruction hint may comprise a control directive or message from a software component of an electronic device, such as a touch gesture processed by a user interface component. In one embodiment, for example, an instruction hint may comprise an electrical signal from a hardware component of an electronic device, such as a touch screen display or a processor. In one embodiment, for example, an instruction hint may comprise a software instruction added to a set of program instructions. In various embodiments, an instruction hint may be used to initiate an early response from device resources involved in adjusting one or more operational states of the electronic device, such as adjusting a clock frequency corresponding to the processor. For example, the processor may prefetch an instruction that adjusts the clock frequency corresponding to the processor in response to the instruction hint, among other operations. Embodiments are not limited to this example.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrases "in one embodiment," "in some embodiments," and "in various embodiments" in various places in the specification are not necessarily all referring to the same embodiment.

FIG. 1 illustrates an example device for controlling, in a power efficient manner, an operational state for various components of an electronic device in response to a touch gesture event. More particularly, FIG. 1 illustrates an example for intelligently boosting, in a power efficient manner, processor frequency (e.g., a CPU, GPU, baseband processor, controller, etc.) in response to a touch gesture event. As shown in FIG. 1, the example device includes a device 100, such as a mobile device that is operable to support clock frequency boost based on a user interface touch gesture. Examples of other mobile/portable electronic devices include wireless communication devices such as pagers, mobile or cellular phones, smartphones, wireless organizers, PDAs, notebook computers, netbook computers, tablet computers, and the like. The device 100 may also be a portable electronic device without wireless communication capabilities. Examples include handheld electronic game device, digital photograph album, digital camera, notebook computers, netbook computers, tablet computers, or other device. It may be appreciated that these are merely a few examples, and various embodiments are not limited to a particular type of electronic device.

In some embodiments, device 100 has a user interface 102. The user interface 102 can be rendered on an electronic display 103 (e.g., a touch screen display), and may present or reproduce various user interface views (e.g., comprised of various user interface elements) for a user on an output device (e.g., a display screen, speaker, vibrator, etc.), accept control directives from the user via an input device (e.g., a touch screen, a keyboard, a microphone, etc.) or a combination thereof. A user can interact with the device 100 through the user interface 102. In some implementations, the user interface 102 can include a speaker and a microphone to enable audio-based user interactions.

A user interaction can occur, for example, when an application 104 running on the device 100 generates user interface views or display frames that are reproduced on the screen of the user interface 102. The user then provides an input, that is, interacts with the user interface 102 in response to the information presented by the device 100. The interaction can take place by touching the screen with a finger or with a stylus, by typing information using the keyboard, and/or by speaking into the microphone. As a result of the user interactions, new display frames can be generated. For example, the user can select to scroll down a web page or change to a different web page. In another example, the user can interact with a game or interactive application. In each of these instances, new display frames are generated and reproduced to show different visual graphics.

The device 100 can include several hardware components such as a CPU 106, a GPU 108, a memory 110, and one or more devices 112. Running on the device 100 can be one or more software components such as an operating system 114 and the application 104.

The CPU 106 can include one or more integrated circuits that are operable to carry out the instructions of a program or application by performing arithmetical, logical, and input/output operations. A clock frequency of the CPU 106 can be dynamically adjusted by a clock frequency controller 116 (e.g., a multiplier) of the CPU 106 based on the processing demands required from the CPU 106 as a result of user interactions.

The GPU 108 can include one or more integrated circuits that are operable to manipulate and process data to accelerate the building of images or display frames intended for output to a display or screen in the device 100. The clock frequency of the GPU 108 can be dynamically adjusted by a clock frequency controller 118 of the GPU 108 based on the processing demands required from the GPU 108 as a result of user interactions.

The memory 110 can include one or more integrated circuits that are operable to store and/or retrieve data that can be utilized in the operations performed by the CPU 106, the GPU 108, and/or the devices 112. The memory 110 can be connected to other hardware components through one or more memory buses. The clock frequency of a memory bus can be dynamically adjusted based on the data access demands required from the memory 110 as a result of user interactions.

The devices 112 can include different types of input devices, output devices, and/or input/output (I/O) devices. For example, the devices 112 can include a keyboard to type information, a speaker for audio reproduction, and/or a microphone for capturing audio. When the user interface 102 is a touch screen, for example, it can also be used to receive input from a user by touching a portion of the screen with a finger or with a stylus.

The operating system 114 can include software that is used to manage the various hardware resources of the device 100. The operating system 114 can also be used to provide common services to computer programs or applications. In some embodiments, the operating system 114 acts as an intermediary between hardware components and the application 104.

The application 104 can include one or more software applications (e.g., computer programs) that help the user perform a specific task. For example, a software application can include an interactive application that displays content to a user and allows the user to provide input as to the manner in which the content is provided and/or the type of content that is provided. To perform a task (e.g., web browsing, video playback), the application(s) 104 can access the CPU 106, the GPU 108, the memory 110, and/or the devices 112 through the operating system 114.

Figure 2A:
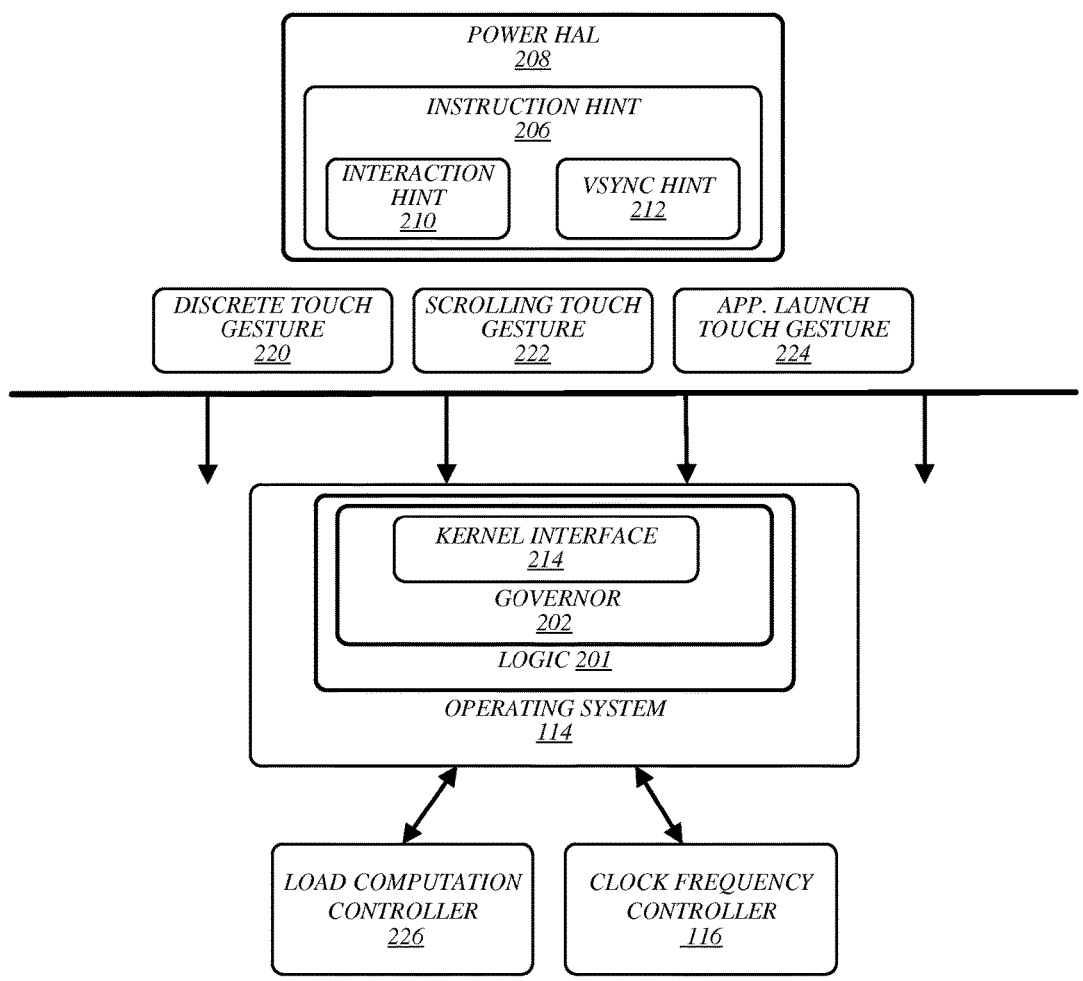
FIG. 2A illustrates one embodiment of an apparatus.

FIG. 2A illustrates an example apparatus for intelligently boosting, in a power efficient manner, CPU frequency in response to a touch gesture event. As shown in FIG. 2A, with reference also to FIG. 1, the example apparatus includes apparatus 200. In one embodiment, the apparatus 200 includes logic 201, a portion of which is implemented in hardware, comprising a governor 202 of a processor (e.g., CPU 106) for receiving an instruction hint 206 provided by an abstraction layer to hardware resources of the application 104, such as a power hardware abstraction layer (HAL) 208. The power HAL 208 comprises a layer of programming that allows the operating system 114 to interact with hardware devices at a general or abstract level rather than at a detailed hardware level.

The instruction hint 206 includes one or more of an interaction hint 210 and a vertical synchronization (VSYNC) hint 212 delivered to a kernel interface 214 of governor 202. Both the interaction hint 210 and VSYNC hint 212 represent software instructions/messages added to a set of program instructions to indicate imminent receipt of a control directive, for example, an instruction to modify the CPU clock frequency. The apparatus 200 further includes a load computation controller 226 for modifying a load computation timer rate, and the clock frequency controller 116 for modifying a clock frequency corresponding to the CPU 106 in response to the instruction hint 206. In some embodiments, the load computation controller 226 and the clock frequency controller 116 may be implemented in software, firmware, and/or hardware (e.g., a processing component), or as a component of the operating system 114.

In some embodiments, the kernel interface 214 of the governor 202 can provide the connection between the application 104, e.g., and the hardware resources of the device 100. That is, the power HAL 208 can be called from the kernel interface 214 to provide an abstraction layer for the hardware resources that the interactive application 104 can control to perform its functions and/or tasks.

The governor 202 is configured to provide various power-management schemes for one or more of the hardware components of the device 100. In normal operation, the governor 202 and the clock frequency controller 116 can scale the clock frequency of one or more processors (e.g., CPU 106) and/or the clock frequency of a memory bus based on a measured system load. That is, when the system load increases, the governor 202 can increase the clock frequency of one or more processors and/or the clock frequency of a memory bus to a determined frequency value. Increasing the clock frequency enables additional computational resources to be made available to address the added system load requirements. Similarly, when the system load decreases, the governor 202 and the clock frequency controller 116 can decrease the clock frequency of one or more processors and/or the clock frequency of a memory bus to a determined frequency value. Decreasing the clock frequency conserves battery life when the system load requirements are low. This operation can be done dynamically such that multiple adjustments to the clock frequency can occur over time based on the measured system load.

More specifically, when the governor 202 receives an indication from the power HAL 208 that a touch gesture has been received at the user interface 102 (FIG. 1), the governor 202 can set or enable a flag to use instruction hint 206 to indicate that additional computational resources are needed. In this instance, the governor 202 can ramp up or increase the clock frequency of the CPU 106, the GPU 108, and/or a memory bus corresponding to the memory 110. Because it is not necessary to wait until a measurement shows that the system load has actually increased, the clock frequency is increased more rapidly using the instruction hint 206.

In some embodiments, the governor 202 can perform voltage adjustment or enable overclocking of the hardware components. While the voltage adjustment can be performed independently of other adjustments, there may be situations in which it can be performed in connection with raising or lowering the clock frequency. For example, an increase in voltage may be needed to run the clock at a faster rate, which increases the amount of power used. While lowering the clock's rate reduces the amount of power used, also lowering the voltage provides additional power savings. Thus, when the governor 202 receives the instruction hint 206, the governor 202 can perform a wide range of adjustments to the system hardware (e.g., the CPU 106, the GPU 108, a memory bus corresponding to the memory 110) that affect the power state and availability of computational resources.

Although a single governor 202 is shown in FIG. 2, other implementations can be used in which more than one governor is available in the operating system 114. For example, each of the hardware components or resources that are to have their clock frequencies adjusted can have a dedicated governor. Moreover, governors that do not support interactive operations in the manner described above can also be available in the operating system 114 and the governor 202 can be selected for operation from among the various governors available.

According to some embodiments, the instruction hint 206 is provided by the power HAL 208 in response to a discrete touch gesture 220 to the user interface 102. In this scenario, the discrete touch gesture 220 represents a simple, brief touch to the user interface 102. Every initial touch on the user interface 102, including discrete touch gesture 220, corresponds to an interaction hint 210, which is used by the clock frequency controller 116 to boost the CPU frequency to a desired frequency level (e.g., a maximum level) to achieve high performance and user experience. In some embodiments, the frequency level to which the apparatus 200 should boost in response to the discrete touch gesture 220 is set as a tunable in the governor 202, and is user-selected based on a desired power budget. In each case, the clock frequency controller 116 may increase the clock frequency from a first frequency level to a second, higher frequency level in response to the interaction hint 210. Increasing the clock frequency enables additional computational resources to be made available to address the added system load requirements caused by the discrete touch gesture 220.

According to other embodiments, the instruction hint 206 is provided by the power HAL 208 in response to a scrolling touch gesture 222 to the user interface 102. In this scenario, which may correspond, e.g., to a gaming application in which the user tends to spend more time with his/her finger in continuous contact with the screen while moving around the user interface 102, the interaction hint 210 causes a resultant frequency spike in response to the added system load requirements caused by the initial contact and subsequent scrolling touch gesture 222. As it's often inefficient to boost the CPU frequency to a maximum value for an entire duration of a scrolling gesture and/or continuous touch to the screen, the clock frequency controller 116 may decrease the clock frequency to a third frequency level between the first frequency level and the second frequency level during the scrolling touch gesture. Decreasing the clock frequency reduces the number of computational resources made available, which conserves power.

In some embodiments, the clock frequency is reduced to the third frequency level by dynamically reducing a load computation timer rate (e.g., from 100 ms to 20 ms), which corresponds to a duration for which the load is computed. The power HAL 208 in combination with the load computation controller 226, connected together via kernel interface 214, ensure that the governor 202 is optimized for the duration of the scrolling touch gesture 222 by decreasing the load computation timer rate. As a result, the governor 202 is more sensitive due to the additional computation cycles performed, and is therefore more likely to make a more accurate prediction of the load at various points throughout the scrolling gesture 222. This increases energy conservation, as the number of instances in which the frequency is set to a maximum value is reduced, yet results in a better user experience because high frequency levels are available when needed.

According to other embodiments, the instruction hint 206 is provided by the power HAL 208 in response to an application launch touch gesture 224 that triggers an application to launch. In this scenario, which may correspond, e.g., to a user touch to an application icon, the VSYNC hint 212 is provided by the power HAL 208 in response. The VYSNC hint 212 is an indication to the governor 202 that a VSYNC pulse has been requested. The governor 202 and the clock frequency controller 116 ramp up the clock frequency of the CPU 106, the GPU 108, and/or a memory bus corresponding to the memory 110 to provide enough hardware resources quickly to the application. The VSYNC pulse is then provided to the application, which in turn draws a new display frame to operate the application in a smooth manner. The process may be repeated multiple times until the application is launched. That is, multiple VSYNC hints 112 can be delivered by power HAL 208, which in turn may generate multiple indications to the governor 202 to maintain the clock frequencies high while the application is opening. Governor 202 can return to normal operation automatically after the application is fully launched or after a pre-determined period of time.

In some embodiments, the power HAL 208 transmits both the interaction hint 210 and the VSYNC hint 212 in response to the triggering of the application launch. That is, the initial touch frequency boost is first recognized when the application starts to launch, followed by a series of vsync frequency boosts to ensure optimal CPU bandwidth during the remainder of the application launch.

In some embodiments, the apparatus 200 first establishes whether a touch gesture by the user to the user interface 102 is more appropriately classified as a discrete touch gesture or a scrolling touch gesture. This can be accomplished by classifying touches as either short or long based on the duration of each finger press. For example, a shorter duration normal touch press (e.g., press on the screen and release right away) corresponds to the discrete touch gesture 220, while a longer duration press (e.g., touch the screen and hold the finger on it) and movement (dragging on the screen) corresponds to the scrolling touch gesture 222.

FIG. 2B represents an example operation 250 for intelligently boosting, in a power efficient manner, CPU frequency in response to a touch gesture event. As shown in FIG. 2B, with reference also to FIGS. 1 and 2A, the device 100 receives a touch gesture 250 provided by a user, such as a scrolling touch gesture to the electronic display 103, an application launch touch gesture to the electronic display 103 that triggers an application launch, or a discrete touch gesture to the electronic display 103. The touch gesture 250 is received at the power HAL 208, and recognized as either the discrete touch gesture 220, the scrolling touch gesture 222, or the application launch touch gesture 224. Based on the type of touch gesture received, one or more instruction hints 206 are provided to the governor 202.

According to one example scenario, the instruction hint 206 is provided by the power HAL 208 in response to the discrete touch gesture 220. This results in the interaction hint 210 being used by the clock frequency controller 116 to boost the CPU frequency from a first frequency level to a second, higher frequency level. After a period of time, the CPU frequency is returned to the first frequency level, for example, at the conclusion of the discrete touch gesture 220.

According to another example scenario, the instruction hint 206 is provided by the power HAL 208 in response to the scrolling touch gesture 222. This results in a frequency spike in response to the added system load requirements caused by the initial contact and subsequent scrolling touch gesture 222. After a period of time, the clock frequency controller 116 may decrease the clock frequency to a third frequency level between the first frequency level and the second frequency level during the scrolling touch gesture. After a period of time, the CPU frequency is returned to the first frequency level, for example, at the conclusion of the scrolling touch gesture 222.

According to another example scenario, the instruction hint 206 is provided by the power HAL 208 in response to the application launch touch gesture 224, which triggers an application to launch. This results in the governor 202 and the clock frequency controller 116 ramping up the clock frequency of the CPU to the second frequency level. The VSYNC pulse is then provided to the application to maintain the clock frequency of the CPU at the second frequency level, which in turn draws a new display frame to operate the application in a smooth manner. After a period of time, the CPU is returned to the first frequency level, for example, at the conclusion of the application launch.

FIG. 3 illustrates an example frequency scenario. Shown in FIG. 3, with reference also to FIG. 2, is a timing diagram 300 that illustrates changes to a clock frequency when one or more instruction hints are received by the governor. In some embodiments, the timing diagram 300 from time t0 to time t2 corresponds to the first scenario described above in which the instruction hint 206 is provided by the power HAL 208 in response to the discrete touch gesture 220 to the user interface 102. Specifically, at time t0, the governor 202 is operating at normal levels. At time t1, the discrete touch gesture 220 is detected, and the interaction hint 210 is sent to the governor 202. This rapidly boosts the CPU frequency from frequency level f1 to a desired frequency level f2 (e.g., a maximum level), which may be set as a tunable in the governor 202.

At time t2, the governor 202 can clear the flag or condition mark and can rapidly ramp down the clock frequency of the processor. In some embodiments, the time duration between time t1 and time t2, in which the frequency is maintained at frequency level f2, can be predetermined or determined dynamically based on the detected CPU load. At time t2, the governor 202 can resume normal operations whereby the clock frequency is scaled or adjusted based on a measured system load. For example, at time t2, the clock frequency can be reduced back to frequency level f1 or to another value that is based on the current system load measurement.

A similar clock frequency scaling operation as the one described above can occur later, as also shown in the timing diagram 300. In some embodiments, the timing diagram 300 from time t3 to time t5 corresponds to the second scenario described above in which the instruction hint 206 is provided by the power HAL 208 in response to the scrolling touch gesture 222 to the user interface 102. Specifically, between times time t2 and time t3, the governor 202 is operating at normal levels. At time t3, the scrolling touch gesture 222 is detected, and the interaction hint 210 is sent to the governor 202. This rapidly boosts the CPU frequency from frequency level f1 to a desired frequency level f2 (e.g., a maximum level), which may be set as a tunable in the governor 202. The resultant frequency spike at time t3 is generated in response to the added system load requirements caused by the initial contact to the user interface during the scrolling touch gesture 222. In some embodiments, the time duration between time t3 and time t4, in which the frequency is maintained at frequency level f2, can be predetermined or determined dynamically based on the detected CPU load.

At time t4, the clock frequency is decreased to a third frequency level f3, which is between the first frequency level and the second frequency level. In some embodiments, frequency level f3 is maintained throughout the duration of the scrolling touch gesture 222, which is concluded at time t5. In other embodiments, the frequency level between time t4 and time t5 may fluctuate dynamically in response to the load computation timer rate, which can be increased or decreased. In this case, the power HAL 208 in combination with the kernel interface 214 ensures that the governor 202 is optimized for the duration of the scrolling touch gesture 222. At time t5, the governor 202 can resume normal operations whereby the clock frequency is scaled or adjusted based on a measured system load. For example, at time t5, the clock frequency can be reduced back to frequency level f1 or to another value that is based on the current system load measurement.

FIG. 3 also illustrates changes to the clock frequency in the case that the instruction hint 206 received by the governor 202 is the VSYNC hint 212. In some embodiments, the timing diagram 300 from time t0 to time t2 corresponds to the third scenario described above in which the VSYNC hint 212 is provided by the power HAL 208 in response to the application launch touch gesture 224. Specifically, at time t0, the governor 202 is operating at normal levels. At time t1, the application launch touch gesture 224 is detected, and the VSYNC hint 212 is sent to the governor 202. This rapidly boosts the CPU frequency from frequency level f1 to a desired frequency level f2 (e.g., a maximum level), which may be set as a tunable in the governor 202. At time t2, the governor 202 can clear the flag or condition mark corresponding to the VSYNC hint 212 and can rapidly ramp down the clock frequency of the processor. In some embodiments, the time duration between time t1 and time t2, in which the frequency is maintained at frequency level f2, can be predetermined or determined dynamically based on the detected CPU load. At time t2, the governor 202 can resume normal operations whereby the clock frequency is scaled or adjusted based on a measured system load. For example, at time t2, the clock frequency can be reduced back to frequency level f1 or to another value that is based on the current system load measurement.

As stated above, in some embodiments, the power HAL 208 transmits both the interaction hint 210 and the VSYNC hint 212 in response to the triggering of the application launch at time t1, which causes the frequency to increase from frequency level f1 to frequency level f2. In some embodiments, the initial touch frequency boost and the VSYNC frequency boosts are set to the same frequency, e.g., to a maximum CPU frequency, f2. However, the frequency levels for the initial touch boost and/or the VSYNC boost may be user-defined in other embodiments, for example, to an intermediate level.

Included herein is a set of logic flows representative of example methodologies for performing novel aspects of the disclosed embodiments. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, and/or hardware. In software and firmware embodiments, a logic flow may be implemented by computer executable instructions stored on at least one non-transitory computer readable medium or machine readable medium, such as an optical, magnetic or semiconductor storage. The embodiments are not limited in this context.

Figure 4:
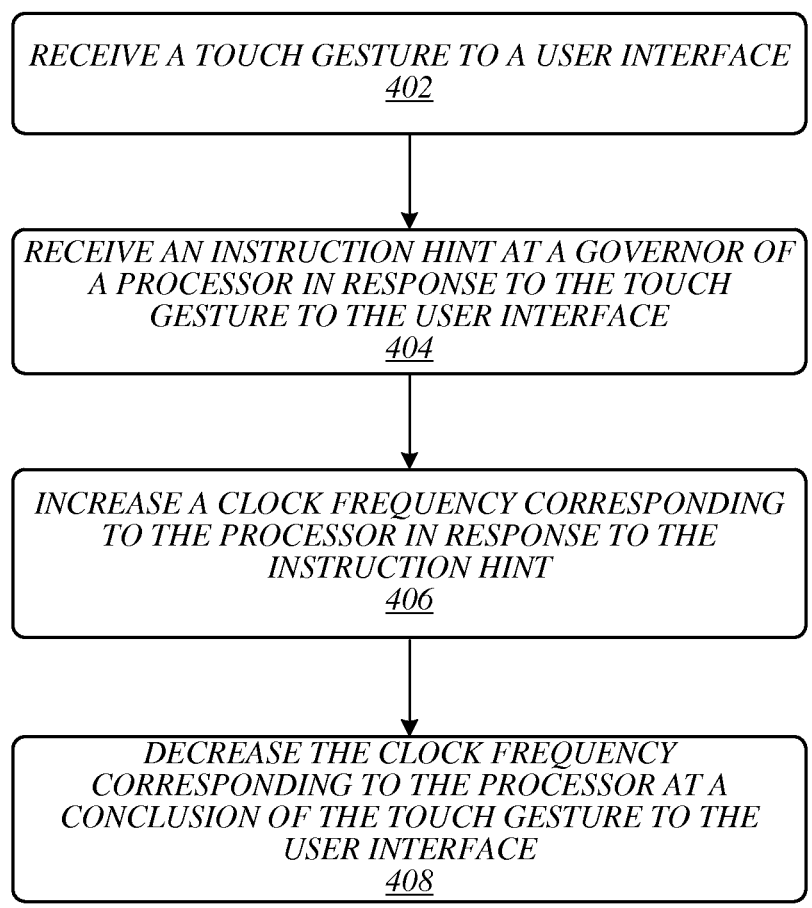
FIG. 4 illustrates one embodiment of a first logic flow.

FIG. 4 illustrates an example of a logic flow 400. Logic flow 400 may be representative of some or all of the operations executed by one or more logic, features, or devices described herein, such as shown in FIGS. 1 and/or 2. More particularly, logic flow 400 may be implemented by logic and/or features of a system for intelligently boosting, in a power efficient manner, CPU frequency in response to a touch gesture event, such as device 100 and apparatus 200, shown in FIGS. 1 and 2, respectively.

According to some examples, logic flow 400 at block 402 may receive a touch gesture to a user interface. For these examples, the touch gesture may include as at least one of: the discrete touch gesture 220, the scrolling touch gesture 222, and application launch touch gesture 220.

According to some examples, logic flow 400 at block 404 may receive an instruction hint at a governor of a processor in response to the touch gesture to the user interface. For these examples, the instruction hint includes at least one of the interaction hint 210 and the VSYNC hint 212.

According to some examples, logic flow 400 at block 406 may increase a clock frequency corresponding to the processor in response to the instruction hint. For these examples, the clock frequency may be increased from the first frequency level f1 to the second frequency level f2.

In some examples, logic flow 400 at block 408 may decrease the clock frequency corresponding to the processor at a conclusion of the touch gesture to the user interface. For these examples, the clock frequency may be decreased, after a period of time, from frequency level f2 to either the third frequency level f3 or to the first frequency level f1.

Figure 5:
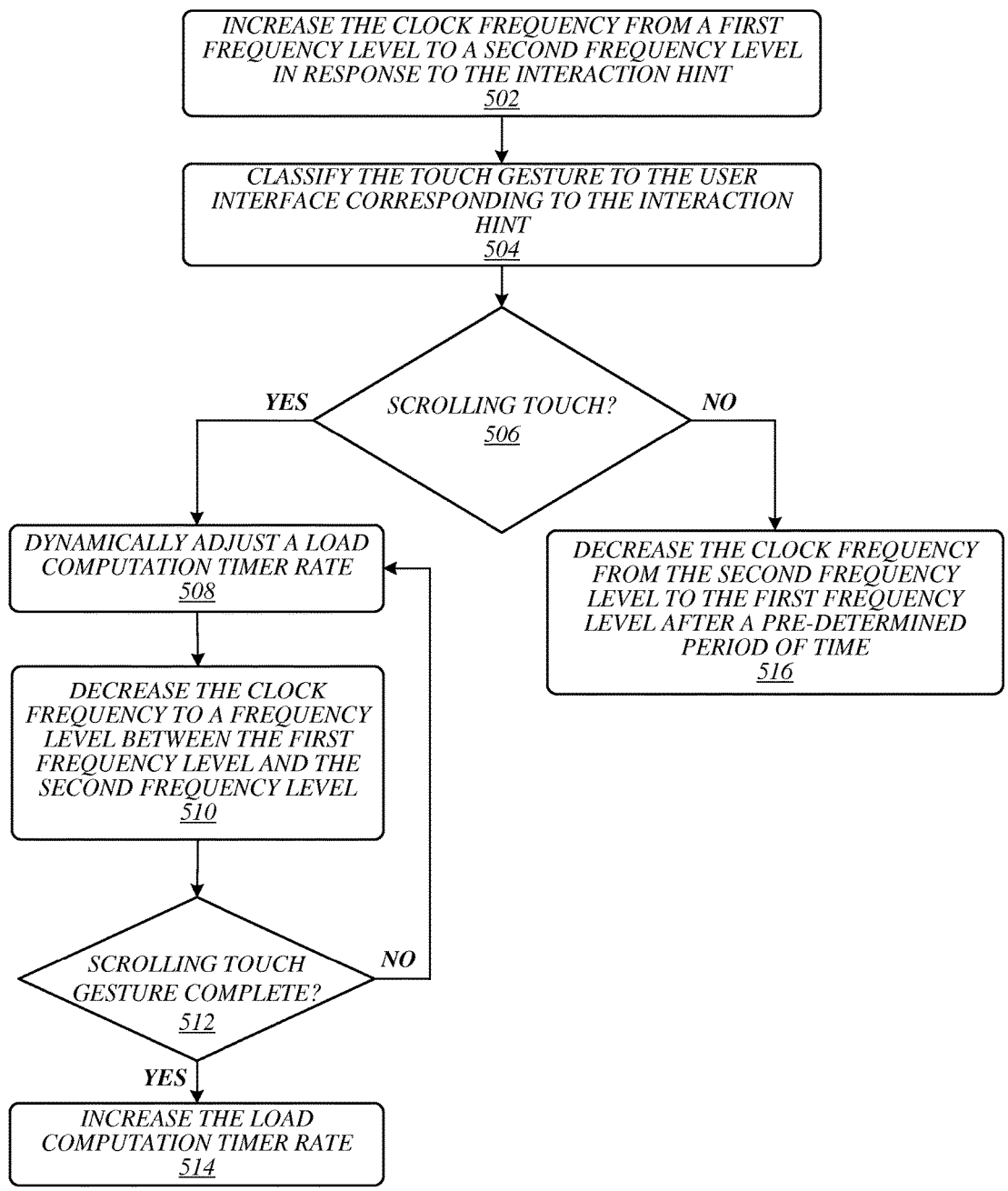
FIG. 5 illustrates one embodiment of a second logic flow.

FIG. 5 illustrates an example of a logic flow 500. Logic flow 500 may be representative of some or all of the operations executed by one or more logic, features, or devices described herein, such as shown in FIGS. 1 and/or 2. More particularly, logic flow 500 may be implemented by logic and/or features of a system for intelligently boosting, in a power efficient manner, CPU frequency in response to discrete touch gestures and/or scrolling touch gestures, such as device 100 and apparatus 200, shown in FIGS. 1 and 2, respectively.

According to some examples, logic flow 500 at block 502 may increase the clock frequency from a first frequency level to a second frequency level in response to the interaction hint.

According to some examples, logic flow 500 at block 504 may classify the touch gesture to the user interface corresponding to the interaction hint. For these examples, the touch may be classified as either short or long based on the duration of each finger press.

According to some examples, logic flow 500 at block 506 may determine whether the touch gesture to the user interface is a scrolling touch gesture. For these examples, a shorter duration normal touch press (e.g., press on the screen and release right away) corresponds to the discrete touch gesture 220, while a longer duration press (e.g., touch the screen and hold the finger on it) and movement (dragging on the screen) corresponds to the scrolling touch gesture 222.

In the case that logic flow 500 at block 506 determines that the touch gesture to the user interface is a scrolling touch gesture, logic flow 500 at block 508 may dynamically adjust a load computation timer rate. For these examples, the power HAL 208 in combination with the kernel interface 214 ensure that the governor 202 is optimized for the duration of the scrolling touch gesture 222 by dynamically adjusting (e.g., reducing) the load computation timer rate, which corresponds to a duration for which the load is computed, to increase sensitivity and accuracy of the governor 202.

According to some examples, logic flow 500 at block 510 may decrease the clock frequency to a different frequency level between the first frequency level and the second frequency level. For these examples, the clock frequency is reduced from frequency level f2 to frequency level f3 in response to the reduced load computation timer rate.

According to some examples, logic flow 500 at block 512 may determine whether the scrolling touch gesture is complete. For these examples, the scrolling touch gesture 222 is deemed completed when the user removes his/her finger from the user interface 102.

In the case that logic flow 500 at block 512 determines that the scrolling touch gesture is not complete, logic flow 500 returns to block 508. According to some examples, in the case that logic flow 500 at block 512 determines that the scrolling touch gesture is complete, then logic flow 500 at block 514 may increase the load computation timer rate. For these examples, the clock frequency is decreased to frequency level f1 in response to the increased load computation timer rate.

According to some examples, in the case that logic flow 500 at block 506 determines that the touch gesture is not a scrolling touch gesture, then it is determined that the touch gesture is a discrete touch gesture, and logic flow 500 at block 516 may decrease the clock frequency from the second frequency level to the first frequency level after a pre-determined period of time. For these examples, the clock frequency is decreased from frequency level f2 back to frequency level f1.

Figure 6:
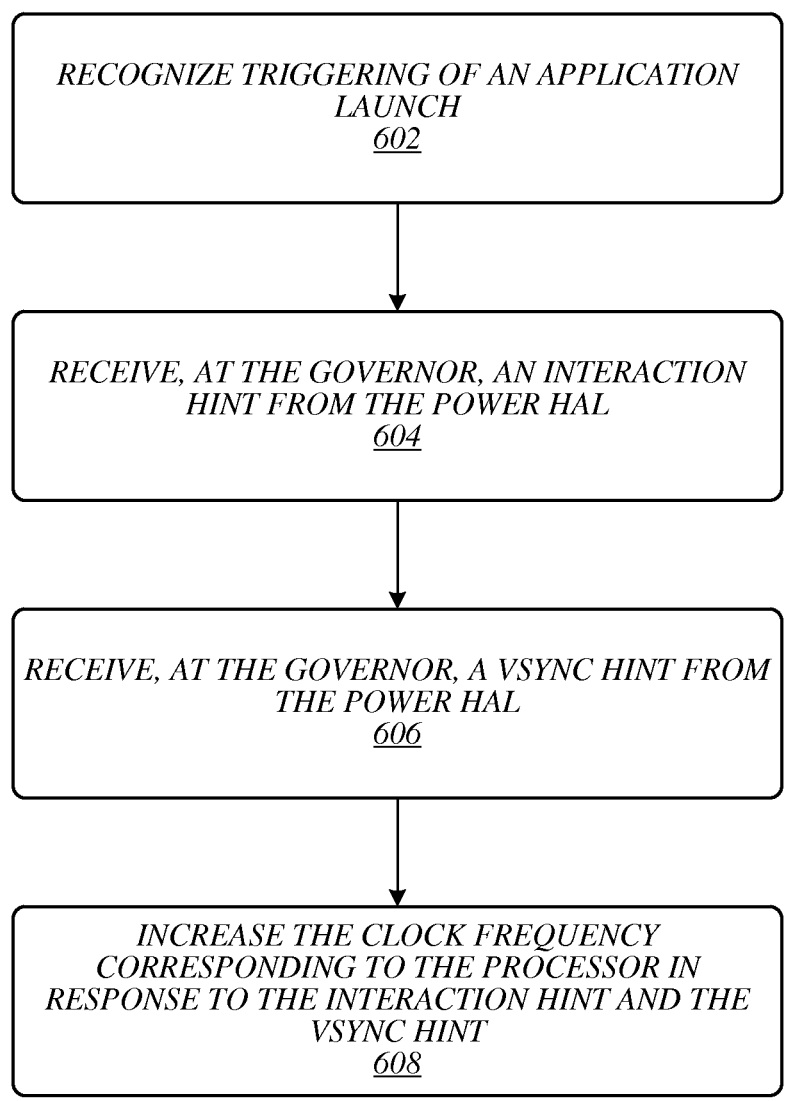
FIG. 6 illustrates one embodiment of a third logic flow.

FIG. 6 illustrates an example of a logic flow 600. Logic flow 600 may be representative of some or all of the operations executed by one or more logic, features, or devices described herein, such as shown in FIGS. 1 and/or 2. More particularly, logic flow 600 may be implemented by logic and/or features of a system for intelligently boosting, in a power efficient manner, CPU frequency in response to application launch touch gestures, such as device 100 and/or apparatus 200, shown in FIGS. 1 and 2, respectively.

According to some examples, logic flow 600 at block 602 may recognize triggering of an application launch. For these examples, this occurs in response to an initial touch to an application icon of the user interface 102.

According to some examples, logic flow 600 at block 604 may receive, at the governor, an interaction hint from the power HAL. For these examples, the interaction hint 210 is provided in response to an initial touch to an application icon of the user interface 102.

According to some examples, logic flow 600 at block 606 may receive, at the governor, a VSYNC hint from the power HAL. For these examples, the VSYNC hint(s) 212 is provided after the initial touch to the application icon, and continues for a duration of the application launch.

According to some examples, logic flow 600 at block 608 may increase the clock frequency corresponding to the processor in response to the interaction hint and the VSYNC hint. For these examples, the initial touch frequency boost resulting from the interaction hint 210 and the VSYNC frequency boosts resulting from the VSYNC hint 212 are set to the same frequency, e.g., to a maximum CPU frequency. However, for these examples, the frequency levels for the initial touch boost and/or the VSYNC boost may be user-defined, e.g., to an intermediate level.

Figure 7:
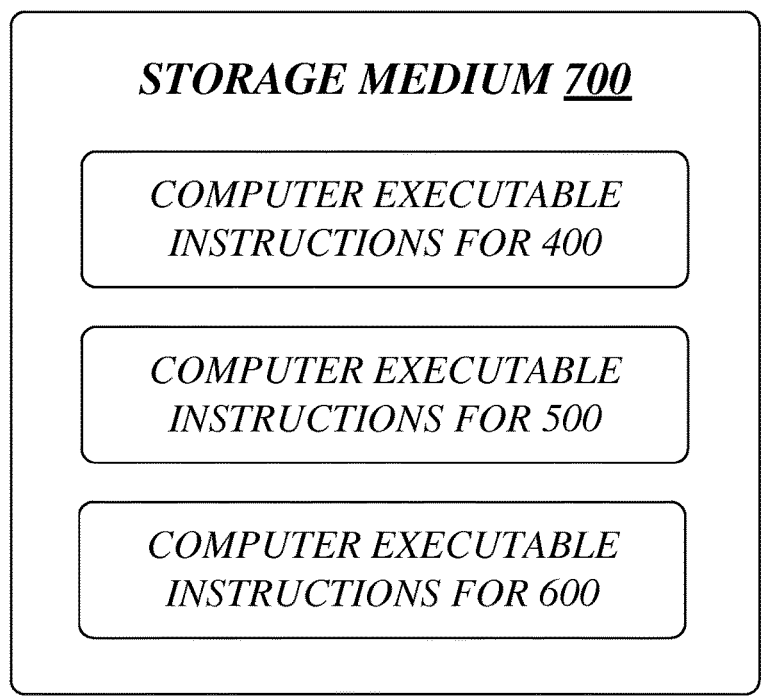
FIG. 7 illustrates one embodiment of a storage medium.

FIG. 7 illustrates an embodiment of a storage medium 700. Storage medium 700 may comprise any non-transitory computer-readable storage medium or machine-readable storage medium, such as an optical, magnetic or semiconductor storage medium. In various embodiments, storage medium 700 may comprise an article of manufacture. In some embodiments, storage medium 700 may comprises a storage device. In some embodiments, storage medium 700 may store computer-executable instructions, such as computer-executable instructions to implement one or more of logic flow 400 of FIG. 4, logic flow 500 of FIG. 5, and logic flow 600 of FIG. 6. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like. The embodiments are not limited in this context.

Figure 8:
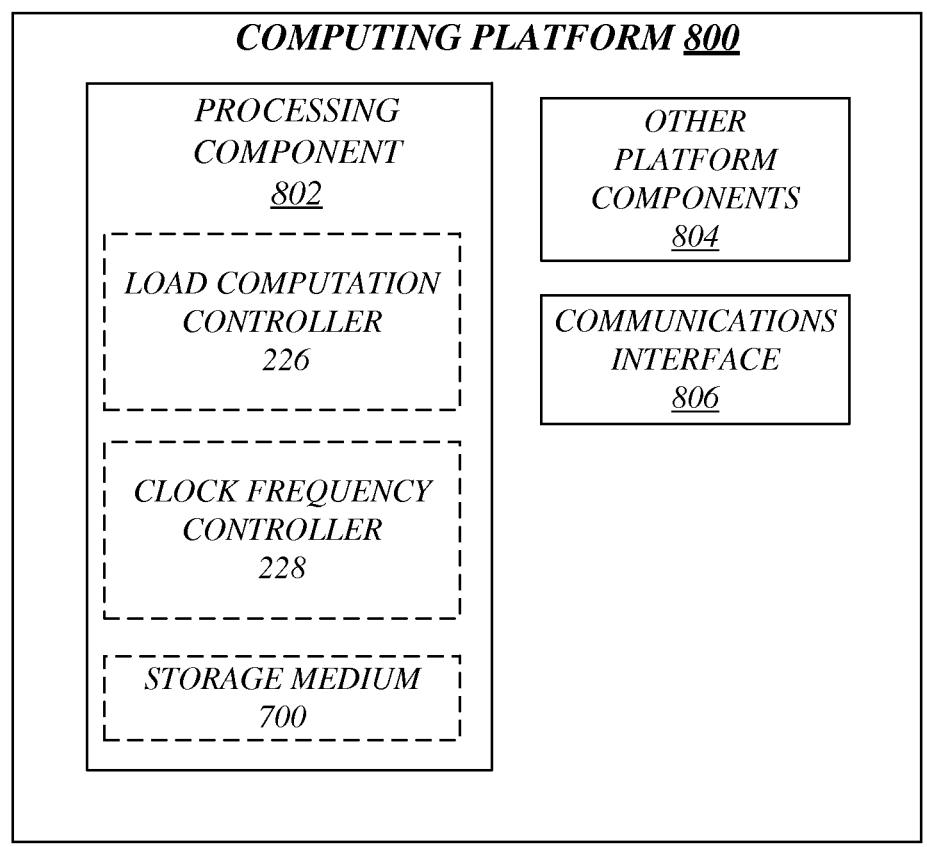
FIG. 8 illustrates one embodiment of a computing platform.

FIG. 8 illustrates an example computing platform 800. In some examples, as shown in FIG. 8, computing platform 800 may include processing component 802, other platform components 804, and a communications interface 806. According to some examples, processing component 802 includes the load computation controller 226, the clock frequency controller 116 and memory 700, and may execute processing or logic operations for one or more components of device 100, apparatus 200, and/or storage medium 700. Processing component 802 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, device drivers, system programs, software development programs, machine programs, operating system software, middleware, firmware, software components, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

In some examples, other platform components 804 may include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory), solid state drives (SSD) and any other type of storage media suitable for storing information.

In some examples, communications interface 806 may include logic and/or features to support a communication interface. For these examples, communications interface 806 may include one or more communication interfaces that operate according to various communication protocols or standards to communicate over direct or network communication links. Direct communications may occur via use of communication protocols or standards described in one or more industry standards (including progenies and variants) such as those associated with the SMBus specification, the PCI Express specification or the USB specification that includes the USB-PD specification. Network communications may occur via use of communication protocols or standards such those described in one or more Ethernet standards promulgated by the Institute of Electrical and Electronics Engineers (IEEE). For example, one such Ethernet standard may include IEEE 802.3-2008, Carrier sense Multiple access with Collision Detection (CSMA/CD) Access Method and Physical Layer Specifications, Published in December 2008 (hereinafter "IEEE 802.3").

Computing platform 800 may be part of a computing device functioning as a USB host for a USB device. The computing device may include, but is not limited to a computer, a personal computer (PC), a desktop computer, a laptop computer, a notebook computer, a netbook computer, a tablet computer, an ultra-book computer. In some examples, the computing device functioning as the USB host and the USB device may both be part of a convertible or 2-in-1 computer. For these examples, the USB host may be a base computing platform including computing, memory, storage and input (e.g., keyboard) capabilities and the USB device may be a removable touch screen tablet having stand-alone computing, memory and storage capabilities. Accordingly, functions and/or specific configurations of computing platform 800 described herein, may be included or omitted in various embodiments of computing platform 800, as suitably desired.

The components and features of computing platform 800 may be implemented using any combination of discrete circuitry, application specific integrated circuits (ASICs), logic gates and/or single chip architectures. Further, the features of computing platform 800 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the example computing platform 800 shown in the block diagram of FIG. 8 may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations may be stored on a tangible, machine readable medium and supplied to various customers or manufacturing facilities to load into the fabrication machines that actually make the logic or processor.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The follow examples pertain to additional examples of technologies disclosed herein.

Example 1

An exemplary method may include detecting a touch gesture for a user interface of an electronic display, providing an instruction hint for a processor in response to the touch gesture, and sending a control directive to modify an operational state for the processor in response to the instruction hint.

Example 2

The method of example 1 may include determining the touch gesture is a scrolling touch gesture to the user interface.

Example 3

The method of example 1 may include determining the touch gesture is an application launch touch gesture to the user interface or a discrete touch gesture to the user interface.

Example 4

The method of example 1 may include determining the instruction hint is an interaction hint or a vertical synchronization (VSYNC) hint.

Example 5

The method of example 1 may include receiving the instruction hint at a governor of the processor.

Example 6

The method of example 2 may include dynamically reducing a load computation timer rate in response to the scrolling touch.

Example 7

The method of example 6 may include increasing a clock frequency from a first frequency level to a second frequency level in response to the instruction hint.

Example 8

The method of example 7 may include decreasing the clock frequency to a third frequency level between the first frequency level and the second frequency level in response to the reduced load computation timer rate.

Example 9

The method of example 8 may include increasing the load computation timer rate upon a conclusion of the scrolling touch.

Example 10

The method of example 9 may include decreasing, in response to the increased load computation timer rate, the clock frequency to the first frequency level.

Example 11

At least one machine readable medium may include a plurality of instructions that in response to being executed by a system cause the system to carry out the any one of examples 1 to 10.

Example 12

An apparatus may include means for performing the methods of any one of examples 1 to 10.

Example 13

An exemplary apparatus may include logic, a portion of which is implemented in hardware, the logic including a governor to receive an instruction hint based on a touch gesture, and output a control directive to modify a clock frequency based on the instruction hint. The exemplary apparatus may further include a clock frequency controller coupled to the logic, the clock frequency controller to receive the control directive, and modify a clock frequency for the processor in response to the control directive.

Example 14

The apparatus of example 13 may include a clock frequency controller to increase the clock frequency for the processor in response to the control directive to increase computational resources for a device.

Example 15

The apparatus of example 13 may include a clock frequency controller to decrease the clock frequency for the processor in response to the control directive to decrease computational resources for a device.

Example 16

The apparatus of example 13 may include a power hardware abstraction layer (HAL) to detect the touch gesture and output the instruction hint to the governor.

Example 17

The apparatus of example 13 may include a load computation controller configured to dynamically reduce a load computation timer rate in response to a scrolling touch.

Example 18

The apparatus of example 17 may include a clock frequency controller configured to increase the clock frequency from a first frequency level to a second frequency level in response to the instruction hint.

Example 19

The apparatus of example 18 may include a clock frequency controller configured to decrease, in response to the reduced load computation timer rate, the clock frequency to a third frequency level between the first frequency level and the second frequency level.

Example 20

The apparatus of example 13 may include a touch screen display coupled to the logic, the touch screen display to receive the touch gesture.

Example 21

The apparatus of example 13, wherein the instruction hint may include an interaction hint or a vertical synchronization (VSYNC) hint.

Example 22

At least one non-transitory computer-readable storage medium may include a set of instructions that, in response to being executed on a processing component at a computing platform, cause the processing component to detect a touch gesture for a user interface of an electronic display, provide an instruction hint for a processor in response to the touch gesture, and send a control directive to modify an operational state for the processor in response to the instruction hint.

Example 23

The at least one non-transitory computer-readable storage medium according to example 22 may include instructions that, in response to being executed on the processing component at the computing platform, cause the processing component to determine the touch gesture is a discrete touch gesture to the user interface, a scrolling touch gesture to the user interface, or an application launch touch gesture to the user interface.

Example 24

The at least one non-transitory computer-readable storage medium according to example 22 may include instructions that, in response to being executed on the processing component at the computing platform, cause the processing component to determine the instruction hint is an interaction hint or a vertical synchronization (VSYNC) hint.

Example 25

The at least one non-transitory computer-readable storage medium according to example 22 may include instructions that, in response to being executed on the processing component at the computing platform, cause the processing component to receive the instruction hint at a governor of the processor.

Example 26

The at least one non-transitory computer-readable storage medium according to example 25 may include instructions that, in response to being executed on the processing component at the computing platform, cause the processing component to receive the instruction hint at a kernel interface operable with the governor.

Example 27

The at least one non-transitory computer-readable storage medium according to example 25 may include instructions that, in response to being executed on the processing component at the computing platform, cause the processing component to dynamically reduce a load computation timer rate in response to the scrolling touch.

Example 28

The at least one non-transitory computer-readable storage medium according to example 27 may include instructions that, in response to being executed on the processing component at the computing platform, cause the processing component to increase the clock frequency from a first frequency level to a second frequency level in response to the instruction hint.

Example 29

The at least one non-transitory computer-readable storage medium according to example 28 may include instructions that, in response to being executed on the processing component at the computing platform, cause the processing component to decrease, in response to the reduced load computation timer rate, the clock frequency to a third frequency level between the first frequency level and the second frequency level.

Example 30

An exemplary method may include receiving an instruction hint at a governor of a processor in response to at least one of: a scrolling touch gesture to a user interface, and an application launch touch gesture to the user interface. The exemplary method may further include sending a control signal to increase a clock frequency corresponding to the processor in response to the instruction hint.

Example 31

The method of example 30, the instruction hint may include one of: an interaction hint, and a vertical synchronization (VSYNC) hint.

Example 32

The method of example 30 may include receiving the instruction hint at the governor of the processor in response to a discrete touch gesture to the user interface.

Example 33

The method of example 30 may include dynamically reducing a load computation timer rate in response to the scrolling touch.

Example 34

The method of example 33 may include increasing the clock frequency from a first frequency level to a second frequency level in response to the interaction hint.

Example 35

The method of example 34 may include decreasing the clock frequency to a third frequency level between the first frequency level and the second frequency level in response to the reduced load computation timer rate.

Example 36

The method of example 33 may include increasing the load computation timer rate upon a conclusion of the scrolling touch.

Example 37

The method of example 36 may include decreasing, in response to the increased load computation timer rate, the clock frequency to the first frequency level.

Example 38

The method of example 30 may include receiving the instruction hint from a power hardware abstraction layer at a kernel interface operable with the governor.

Example 39

An exemplary at least one machine readable medium may include a plurality of instructions that in response to being executed by a system cause the system to carry out a method according to any one of examples 30 to 38.

Example 40

An exemplary apparatus may include means for performing the methods of any one of examples 30 to 38.

Example 41

An exemplary apparatus may include a governor of a processor to receive an instruction hint, the instruction hint received in response to at least one of: a scrolling touch gesture to a user interface, and an application launch touch gesture to the user interface. The exemplary apparatus may further include a clock frequency controller, at least a portion of which is in hardware, to increase a clock frequency corresponding to the processor in response to the instruction hint.

Example 42

The apparatus of example 41 may include a power hardware abstraction layer (HAL), the power HAL to communicate the instruction hint to the governor.

Example 43

The apparatus of example 41, the instruction hint may include one of: an interaction hint, and a vertical synchronization (VSYNC) hint.

Example 44

The apparatus of example 41 may include a load computation controller configured to dynamically reduce a load computation timer rate in response to the scrolling touch.

Example 45

The apparatus of example 44 may include a clock frequency controller configured to increase the clock frequency from a first frequency level to a second frequency level in response to the instruction hint.

Example 46

The apparatus of example 45, the clock frequency controller may be configured to decrease, in response to the reduced load computation timer rate, the clock frequency to a third frequency level between the first frequency level and the second frequency level.

Example 47

The apparatus of example 45, the load computation controller may be configured to increase the load computation timer rate upon a conclusion of the scrolling touch.

Example 48

The apparatus of example 47, the clock frequency controller may be configured to decrease, in response to the increased load computation timer rate, the clock frequency to the first frequency level.

Example 49

The apparatus of example 42 may include a kernel interface operably coupled to the governor, the kernel interface to receive the instruction hint from the power HAL.

Example 50

An exemplary at least one non-transitory computer-readable storage medium may include a set of instructions that, in response to being executed on a processing component at a computing platform, cause the processing component to receive an instruction hint at a governor of a processor, the instruction hint provided in response to at least one of: a scrolling touch gesture to a user interface, and an application launch touch gesture to the user interface. The exemplary at least one non-transitory computer-readable storage medium may further include a set of instructions that, in response to being executed on a processing component at a computing platform, cause the processing component to send a control signal, in response to the instruction hint, the control signal to increase a clock frequency corresponding to the processor.

Example 51

The at least one non-transitory computer-readable storage medium according to example 50, the instruction hint may include one of: an interaction hint, and a vertical synchronization (VSYNC) hint.

Example 52

The at least one non-transitory computer-readable storage medium according to example 50, the interaction hint may correspond to a discrete touch to the user interface.

Example 53

The at least one non-transitory computer-readable storage medium according to example 50 may include instructions that, in response to being executed on the processing component at the computing platform, cause the processing component to dynamically reduce a load computation timer rate in response to the scrolling touch.

Example 54

The at least one non-transitory computer-readable storage medium according to example 53 may include instructions that, in response to being executed on the processing component at the computing platform, cause the processing component to increase the clock frequency from a first frequency level to a second frequency level in response to the interaction hint.

Example 55

The at least one non-transitory computer-readable storage medium according to example 54 may include instructions that, in response to being executed on the processing component at the computing platform, cause the processing component to decrease, in response to the reduced load computation timer rate, the clock frequency to a third frequency level between the first frequency level and the second frequency level.

Example 56

The at least one non-transitory computer-readable storage medium according to example 55 may include instructions that, in response to being executed on the processing component at the computing platform, cause the processing component to increase the load computation timer rate upon a conclusion of the scrolling touch, and decrease the clock frequency to the first frequency level in response to the increased load computation timer rate.

Example 57

An exemplary at least one machine readable medium may include a plurality of instructions that in response to being executed by a processor on a computing platform, cause the processor to receive an instruction hint at a governor of a processor, the instruction hint provided in response to at least one of: a scrolling touch gesture to a user interface, and an application launch touch gesture to the user interface. The exemplary at least one machine readable medium further including a plurality of instructions that in response to being executed by a processor on a computing platform, cause the processor to send a control signal, in response to the instruction hint, the control signal to increase a clock frequency corresponding to the processor.

Example 58

The at least one machine readable medium according to example 57, the instruction hint may include one of: an interaction hint, and a vertical synchronization (VSYNC) hint.

Example 59

The at least one machine readable medium according to example 57, the interaction hint may correspond to a discrete touch to the user interface.

Example 60

The at least one machine readable medium according to example 57 may include instructions that, in response to being executed on the processing component at the computing platform, cause the processing component to dynamically reduce a load computation timer rate in response to the scrolling touch.

Example 61

The at least one machine readable medium according to example 61 may include instructions that, in response to being executed on the processing component at the computing platform, cause the processing component to increase the clock frequency from a first frequency level to a second frequency level in response to the interaction hint.

Example 62

The at least one machine readable medium according to example 61 may include instructions that, in response to being executed on the processing component at the computing platform, cause the processing component to decrease, in response to the reduced load computation timer rate, the clock frequency to a third frequency level between the first frequency level and the second frequency level.

Example 63

The at least one machine readable medium according to example 61 may include instructions that, in response to being executed on the processing component at the computing platform, cause the processing component to increase the load computation timer rate upon a conclusion of the scrolling touch.

Example 64

The at least one machine readable medium according to example 63 may include instructions that, in response to being executed on the processing component at the computing platform, cause the processing component to decrease the clock frequency to the first frequency level in response to the increased load computation timer rate.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, comprising:
  detecting a touch gesture for a user interface of an electronic display;
  providing an instruction hint for a processor in response to the touch gesture, the instruction hint comprising an interaction hint or a vertical synchronization (VSYNC) hint;
  sending a control directive to modify an operational state for the processor in response to the instruction hint; and
  adjusting a load computation timer rate in response to the touch gesture when the touch gesture is a scrolling touch gesture, the load computation timer rate corresponding to a duration of a determined processing load on the processor.

2. The method of claim 1, comprising:
  determining the touch gesture is a scrolling touch gesture to the user interface; and
  determining the processing load on the processor for the duration based on at least one of: (i) measuring the processing load on the processor, and (ii) computing a predicted processing load on the processor for the duration.

3. The method of claim 1, comprising determining the touch gesture is an application launch touch gesture to the user interface or a discrete touch gesture to the user interface.

4. The method of claim 1, comprising receiving the instruction hint at a governor of the processor.

5. The method of claim 2, comprising dynamically reducing the load computation timer rate in response to a determined reduced processing load on the processor for a portion of a duration of the scrolling touch.

6. The method of claim 5, comprising increasing a clock frequency from a first frequency level to a second frequency level in response to the instruction hint and a determined increased processing load on the processor.

7. The method of claim 6, comprising decreasing the clock frequency to a third frequency level between the first frequency level and the second frequency level in response to the reduced load computation timer rate.

8. The method of claim 7, comprising increasing the load computation timer rate upon a conclusion of the scrolling touch.

9. The method of claim 8, comprising decreasing, in response to the increased load computation timer rate, the clock frequency to the first frequency level.

10. An apparatus, comprising:
a processing circuitry; and
a memory storing instructions that when executed by the processing circuitry cause the processing circuitry to:
receive an instruction hint based on a touch gesture, the instruction hint comprising an interaction hint or a vertical synchronization (VSYNC) hint;
receive a control directive to modify a clock frequency based on the instruction hint;
modify a clock frequency for a processor in response to the control directive; and
adjust a load computation timer rate in response to the touch gesture when the touch gesture is a scrolling touch gesture, the load computation timer rate to correspond to a duration of a determined processing load on the processor.

11. The apparatus of claim 10, the memory further comprising instructions executable by the processing circuitry to cause the processing circuitry to:
determine an increased processing load on the processor for the duration based on at least one of: (i) measuring the processing load on the processor, and (ii) computing a predicted processing load on the processor for the duration; and
increase the clock frequency for the processor in response to the determined increased processing load on the processor.

12. The apparatus of claim 10, the memory further comprising instructions executable by the processing circuitry to cause the processing circuitry to:
determine a decreased processing load on the processor for the duration based on at least one of: (i) measuring the processing load on the processor, and (ii) computing a predicted processing load on the processor for the duration; and
decrease the clock frequency for the processor in response to the determined decreased processing load on the processor.

13. The apparatus of claim 10, a power hardware abstraction layer (HAL) to detect the touch gesture and output the instruction hint to a governor.

14. The apparatus of claim 10, the memory further comprising instructions executable by the processing circuitry to cause the processing circuitry to:
determine a decreased processing load on the processor for a portion of a duration of a scrolling touch;
dynamically reduce the load computation timer rate in response to the decreased processing load on the processor for the portion of the duration of scrolling touch.

15. The apparatus of claim 14, the memory further comprising instructions executable by the processing circuitry to cause the processing circuitry to increase the clock frequency from a first frequency level to a second frequency level in response to the instruction hint and a determined increased processing load on the processor.

16. The apparatus of claim 15, the memory further comprising instructions executable by the processing circuitry to cause the processing circuitry to decrease, in response to the reduced load computation timer rate, the clock frequency to a third frequency level between the first frequency level and the second frequency level.

17. The apparatus of claim 10, comprising a touch screen display coupled to the logic, the touch screen display to receive the touch gesture.

18. At least one non-transitory computer-readable storage medium comprising a set of instructions that, in response to being executed on a processing component at a computing platform, cause the processing component to:
detect a touch gesture for a user interface of an electronic display;
provide an instruction hint for a processor in response to the touch gesture, the instruction hint comprising an interaction hint or a vertical synchronization (VSYNC) hint;
send a control directive to modify an operational state for the processor in response to the instruction hint; and
adjust a load computation timer rate in response to the touch gesture when the touch gesture is a scrolling touch gesture, the load computation timer rate corresponding to a duration of a determined processing load on the processor.

19. The at least one non-transitory computer-readable storage medium according to claim 18, comprising instructions that, in response to being executed on the processing component at the computing platform, cause the processing component to:
determine the touch gesture is a discrete touch gesture to the user interface, a scrolling touch gesture to the user interface, or an application launch touch gesture to the user interface; and
determine the processing load on the processor for the duration based on at least one of: (i) measuring the processing load on the processor, and (ii) computing a predicted processing load on the processor for the duration.

20. The at least one non-transitory computer-readable storage medium according to claim 18, comprising instructions that, in response to being executed on the processing component at the computing platform, cause the processing component to receive the instruction hint at a governor of the processor.

21. The at least one non-transitory computer-readable storage medium according to claim 18, comprising instructions that, in response to being executed on the processing component at the computing platform, cause the processing component to:
determine a decreased processing load on the processor for a portion of a duration of a scrolling touch gesture; and
dynamically reduce the load computation timer rate based on the determined decreased processing load for the portion of the duration of thescrolling touch gesture.

22. The at least one non-transitory computer-readable storage medium according to claim 21, comprising instructions that, in response to being executed on the processing component at the computing platform, cause the processing component to:
determine an increased processing load on the processor for the duration; and
increase a clock frequency from a first frequency level to a second frequency level in response to the instruction hint and the determined increased processing load on the processor for the duration.

23. The at least one non-transitory computer-readable storage medium according to claim 22, comprising instructions that, in response to being executed on the processing component at the computing platform, cause the processing component to decrease, in response to the reduced load computation timer rate, the clock frequency to a third frequency level between the first frequency level and the second frequency level.

24. The at least one non-transitory computer-readable storage medium according to claim 18, the operational parameter of the processor comprising the clock rate of the processor.

25. The method of claim 1, comprising adjusting a clock rate of the processor in response to adjustment of the load computation timer rate.

* * * * *